May 26, 1970   G. H. AKLIN   3,514,189

FLAT FIELD APOCHROMATIC OBJECTIVE 25X, .65 N.A.

Filed April 1, 1968

GEORGE H. AKLIN
INVENTOR.

BY
AGENT

United States Patent Office 3,514,189
Patented May 26, 1970

1

3,514,189
FLAT FIELD APOCHROMATIC OBJECTIVE
25×, .65 N.A.
George H. Aklin, Fairport, N.Y., assignor to Bausch & Lomb Incorporated, Rochester, N.Y., a corporation of New York
Filed Apr. 1, 1968, Ser. No. 717,768
Int. Cl. G02b 1/00, 9/64
U.S. Cl. 350—215                    7 Claims

ABSTRACT OF THE DISCLOSURE

An apochromatic microscope semi-objective having substantially 5× magnification per se, which is designed for use with an associated negative field flattening lens having substantially 5.0× magnification per se, so as to produce cooperatively a total magnification of substantially 25× per se, and a numerical aperture of 0.65. The semi-objective is one of a set of such semi-objectives of different powers which are used interchangeably with the field flattening lens.

BACKGROUND OF THE INVENTION

This invention is related to microscope optical systems and is more particularly concerned with improvements in the objective system thereof.

A semi-objective of the kind described hereinbelow is intended for use in cooperative association with a plurality or set of other semi-objectives in a rotatable microscope nosepiece, the individual semi-objectives having different respective magnifications covering a large range of image magnifications varying from low to high power. Each such semi-objective is corrected aberrationwise together with a single stationary prescribed negative corrector lens member which is so constructed as to produce the best practical overall correction of the aberrations for the entire set of semi-objectives and to act as a field flattener. In particular, the instant semi-objective together with the negative corrector lens is corrected aberration wise for four different wavelengths, red, green, blue, and violet, in an intermediate power lens system.

With regard to the prior art, the microscope objective most nearly approaching the general optical structure disclosed herein is shown in U.S. Pat. No. 3,174,396 by Paul L. Ruben, which is assigned to the same assignee as the present application. However, there are a number of distinguishing features between the respective lens systems and the characteristics thereof. Initially, subject invention is an apochromatic lens system, while the objective disclosed in the patent is an achromat. This additional and formidable feature of the present invention necessarily distinguishes it from the objective disclosed in the patent. The advantages to the operator gained by this addditional chromatic correction are obvious and need not be discussed herein.

Additionally, the aforementioned prior art objective is not designed to operate as one of a set of semi-objectives with a common corrective lens member. Also, there are several differences in the constructional parameters of the two lens systems.

2

This semi-objective has been designed to be placed into a microscope of the type disclosed in the copending application, Ser. No. 408,875, filed Nov. 4, 1964 by Harold E. Rosenberger, which has been abandoned and replaced by continuation application Ser. No. 732,485, filed May 2, 1968, which is also assigned to the same assignee as the present application, and constitutes one of a particular group of semi-objectives designed to operate cooperatively in the manner described therein.

SUMMARY OF THE INVENTION

It is therefore, an object of the invention to provide a microscope objective having substantially 25× magnification per se, with a numerical aperture of 0.65.

It is a second object of the invention to provide such a microscope objective having superior chromatic and spherical aberration correcting qualities so as to result in an apochromatic lens system.

It is another object of the present invention to provide a microscope semi-objective having substantially 5× magnification capable of use in cooperative association with a related plurality or set of other microscope semi-objectives of different powers of low to high magnification in a rotatable microscope nosepiece with a common negative field flattening and aberration correcting lens having substantially 5.0× magnification per se.

It is a further object of the present invention to provide such a microscope objective lens system which cooperatively produces an excellent flat field and substantially corrects other aberrations including secondary spectrum, Petzval condition, coma, and astigmatism; the construction thereof being comparatively economical when compared to micro-objectives of comparable performance.

Briefly, the invention in its broadest aspect comprises a first singlet positive meniscus lens member (I) which is located adjacent to a specimen surface to be examined at an axial distance designated $S_1$ therefrom. A second singlet positive meniscus lens member (II) is located at an axial distance designated $S_2$ rearwardly of lens member I. A singlet double convex lens member (III) is located at an axial distance designated $S_3$ rearwardly of lens member II. A positive triplet lens member (IV) is located at an axial distance designated $S_4$ rearwardly of lens member III. Lens member IV includes a central double concave lens element (IVb) which lies in surface contact with a front double convex lens element (IVa) and in surface contact with a rear double convex lens element (IVc). A positive doublet lens member (V) is located at an axial distance designated $S_5$ rearwardly of lens member IV. Lens member V includes a front double convex lens element (Va) which lies in surface contact with a rear double concave lens element (Vb). Lens member V is located at an axial distance designated $S_6$ from the negative field flattening lens member (VI) which includes a front double convex lens element (VIa) which lies in surface contact with a rear double concave lens element (VIb).

The ranges of values for the constructional data and the properties of the glasses to be used in the lens system are as specified in the tables hereinbelow.

Further objects, advantages, and features of the invention will be apparent in the arrangement and construction of the constituent parts as set forth in detail in the following specification taken together with the accompanying drawing.

DESCRIPTION OF THE PREFERRED EMBODIMENT

Figure 1:
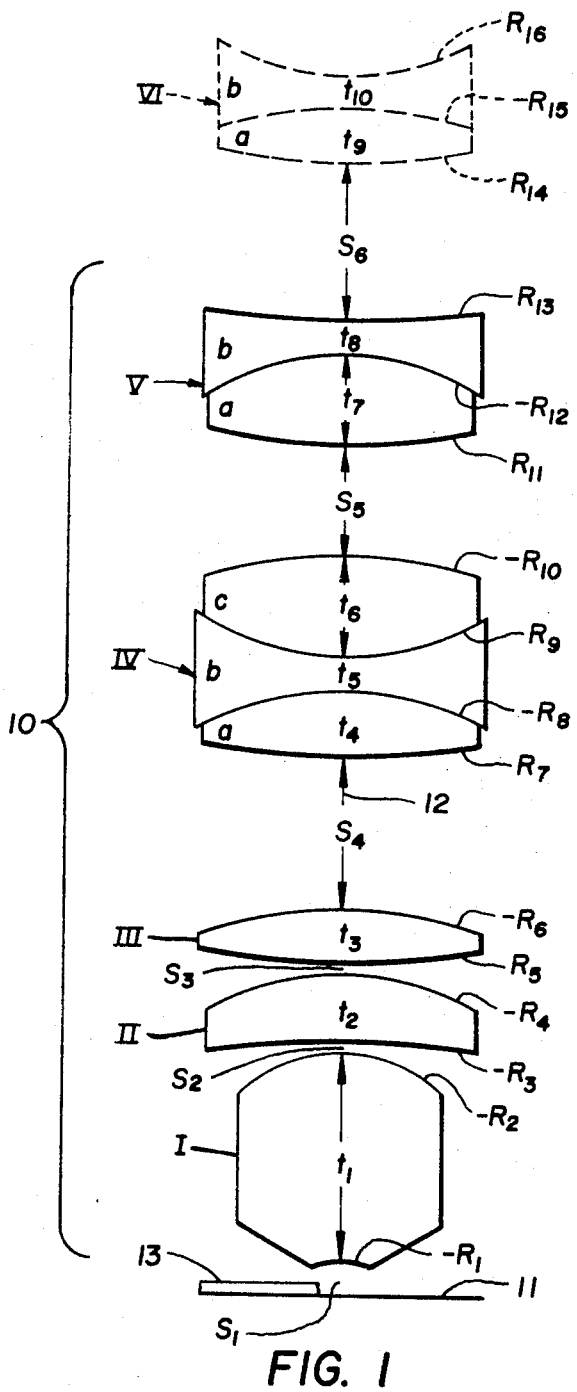
FIG. 1 is an optical diagram showing a preferred embodiment of the present invention.

In the preferred embodiment of the present invention, shown in FIG. 1, there is provided a semi-objective for a microscope, which is shown generally by reference numeral 10 and it comprises a first meniscus singlet lens member I having a positive focal length designated F(I). On lens member I, there is provided a front lens surface $-R_1$ which is concave toward a specimen surface 11 and is spaced therefrom by an axial distance designated $S_1$. The objective provides for the usage of a cover plate 13, which generally is 0.020F in thickness. The rear surface of lens member I is also concave toward surface 11 and is designated $-R_2$; however, lens surface $-R_2$ is comparatively more weakly curved than is lens surface $-R_1$. Surface $-R_1$ is spaced from surface $-R_2$ by an axial distance $t_1$.

It will be hereinafter understood that the use of a minus (−) sign with any R reference designation or value signifies that the center of curvature of the particular lens surface lies in front of the surface, i.e. the surface is concavely curved toward the specimen surface 11.

Rearwardly along an optical axis 12, there is provided a second positive meniscus singlet lens member II which is optically aligned with lens member I and spaced therefrom by a distance designated $S_2$. The front and rear surfaces of lens member II are designated $-R_3$ and $-R_4$ respectively. $-R_4$ is comparatively more strongly curved than $-R_3$ and the axial thickness of lens member II is designated $t_2$.

Spaced rearwardly of lens member II at an axial distance $S_3$ along axis 12 is a singlet double convex lens member III. Lens member III has an axial thickness designated $t_3$ and the front and rear surfaces are designated $R_5$ and $-R_6$ respectively.

At an axial distance $S_4$ rearwardly of lens member III is located a positive triplet lens member IV, which includes a central double concave lens element IVb having an axial thickness $t_5$. The front surface of lens element IVb is designated $-R_8$ and is in surface contact with a front double convex lens element IVa. Lens element IVa has an axial thickness designated $t_4$. The rear lens surface $R_9$ of lens element IVb is in surface contact with a rear double convex lens element IVc having an axial thickness designated $t_6$. The front and rear lens surfaces of the triplet are designated $R_7$ and $-R_{10}$ respectively.

Lens member V is spaced rearwardly along optical axis 12 from lens member IV by a distance designated $S_5$. Lens member V is a positive doublet lens member which includes a front double convex lens element Va which lies in surface contact with a rear double concave lens element Vb. The axial thicknesses of the lens elements Va and Vb are $t_7$ and $t_8$ respectively. The front and the rear lens surfaces of doublet lens member V are designated $R_{11}$ and $R_{13}$ respectively and the interfacing surfaces are designated $-R_{12}$.

At an axial distance $S_6$ rearwardly of lens member V and optically aligned therewith, is the aforementioned field flattening and aberration corecting lens member VI. The meniscus form and optical properties of lens member VI are prescribed as stated hereinabove so that the best average correction of aberrations and field curvature is afforded by lens member VI when used interchangeably with a plurality of semi-objectives having different magnifying powers within a range of 5× to 100×, for example. Lens member VI includes a front positive double convex lens element VIa which lies in surface contact with a rear negative double concave lens element VIb, the axial thicknesses thereof being $t_9$ and $t_{10}$ respectively. Doublet lens member VI has front and rear lens surfaces which are designated $R_{14}$ and $R_{16}$ respectively while the interfacing lens surfaces are designated $-R_{15}$.

The constructional data determined for the final design of the semi-objective 10 together with the negative corrector and field flattening lens member VI is the result of careful calculation and experiment and is set forth in ranges of values which invariably produce a successful optical system, this data is set forth in the tables hereinbelow.

With regard to the optical parameters in Table I, it will be seen that the values of each parameter are given in ranges of values which include a nominal or ideal value. These ranges of values are prescribed for the primary purpose of facilitating the manufacture of the lens elements to commercial standards.

It is well known in the art that it is practically impossible to manufacture a run of lens elements economically while holding all of the lens parameters to specific ideal values. Therefore, the lens designer specifies limits or tolerances, i.e. ranges of values for each lens parameter within which the lens elements may be economically manufactured while still producing a complete objective or lens system which is capable of good and acceptable optical performance.

The technique used by the manufacturer is to separate out and classify the lens elements according to size increments which fall within the ranges of values and then selectively assemble from the lens classes a complete set of lens elements which are complimentary to each other in reducing unwanted aberrations. This technique is highly successful in producing economically commercially acceptable objectives having good optical performance.

In Table I, herebelow, wherein the ranges of values of the constructional parameters are given, F(I), F(II), F(III), F(IV), F(V), and −F(VI) represent the equivalent focal lengths of the successive lens members I, II, III, IV, V, and VI respectively, in terms of F, the equivalent focal length of the entire system of lenses. The equivalent focal length of the lens elements IVa, IVb, IVc, Va, Vb, VIa, VIb are designated F(IVa), −F(IVb), F(IVc), F(Va), −F(Vb), F(VIa), and −F(VIb) respectively, the minus (−) sign meaning negative focal length. The other designations are as specified hereinabove.

TABLE I $3.215F < F(I) < 3.347F$
$3.594F < F(II) < 3.740F$
$4.480F < F(III) < 4.662F$
$129.04 < F(IV) < 134.30F$
$5.619F < F(V) < 5.848F$
$3.668F < -F(VI) < 3.818F$
$2.697F < F(IVa) < 2.807F$
$1.141F < -F(IVb) < 1.187F$
$2.170F < F(IVc) < 2.258F$
$1.496F < F(Va) < 1.558F$
$1.895F < -F(Vb) < 1.973F$
$2.038F < F(VIa) < 2.122F$
$1.233F < -F(VIb) < 1.283F$
$0.086F < S_1 < 0.090F$
$0.066F < S_2 < 0.070F$
$0.063F < S_3 < 0.067F$
$0.749F < S_4 < 0.779F$
$0.524F < C_5 < 0.546F$
$0.736F < S_6 < 0.766F$
$1.029F < t_1 < 1.072F$
$0.336F < t_2 < 0.350F$
$0.243F < t_3 < 0.253F$
$0.336F < t_4 < 0.350F$

TABLE I—Continued $0.157F < t_5 < 0.165F$
$0.478F < t_6 < 0.498F$
$0.441F < t_7 < 0.461F$
$0.169F < t_8 < 0.189F$
$0.271F < t_9 < 0.291F$
$0.159F < t_{10} < 0.179F$
$0.534F < -R_1 < 0.544F$
$0.736F < -R_2 < 0.751F$
$15.951F < -R_3 < 16.299F$
$1.442F < -R_4 < 1.472F$
$6.533F < R_5 < 6.665F$
$2.774F < -R_6 < 2.830F$
$6.070F < -R_7 < 6.193F$
$1.442F < -R_8 < 1.472F$
$1.442F < R_9 < 1.472F$
$2.506F < -R_{10} < 2.558F$
$2.774F < R_{11} < 2.830F$
$1.328F < -R_{12} < 1.355F$
$10.645F < R_{13} < 10.860F$
$4.520F < R_{14} < 4.611F$
$2.286F < -R_{15} < 2.333F$
$1.178F < R_{16} < 1.202F$ Furthermore, the dimensionless numerical ranges of values are given in Table II herebelow for the refractive index $n_D$ and the Abbe number $\nu$ of the glasses used in the successive lens elements I to IVb.

TABLE II $1.6186 < n_D(I) < 1.6216$
$1.4328 < n_D(II) < 1.4348$
$1.4328 < n_D(III) < 1.4348$
$1.4328 < n_D(IVa) < 1.4348$
$1.6115 < n_D(IVb) < 1.6145$
$1.4328 < n_D(IVc) < 1.4348$
$1.6188 < n_D(Va) < 1.6218$
$1.6115 < n_D(Vb) < 1.6145$
$1.7486 < n_D(VIa) < 1.7526$
$1.6115 < n_D(VIb) < 1.6145$
$63.0 < \nu(I) < 64.0$
$94.5 < \nu(II) < 95.9$
$94.5 < \nu(III) < 95.9$
$94.5 < \nu(IVa) < 95.9$
$43.9 < \nu(IVb) < 44.5$
$94.5 < \nu(IVc) < 95.9$
$59.8 < \nu(Va) < 60.8$
$43.9 < \nu(Vb) < 44.5$
$27.6 < \nu(VIa) < 28.0$
$43.9 < \nu(VIb) < 44.5$

More specifically, Table III herebelow presents the substantially nominal values for the parameters stated in the preceding tables. The specific constructional data is given substantially in terms of F, and the glass properties $n_D$ and $\nu$ remain dimensionless numerical values.

TABLE III $F(I) = 3.281F$
$F(II) = 3.667F$
$F(III) = 4.571F$
$F(IV) = 131.67F$
$F(V) = 5.734F$
$-F(VI) = 3.743F$
$F(IVa) = 2.752F$
$-F(IVb) = 1.164F$
$F(IVc) = 2.214F$
$F(Va) = 1.527F$
$-F(Vb) = 1.934F$
$F(VIa) = 2.080F$
$-F(VIb) = 1.258F$ $\dfrac{F(IVa)}{-F(IVb)} = 2.364$ subst.

$\dfrac{F(IVc)}{-F(IVb)} = 1.902$ subst.

$\dfrac{F(Va)}{-F(Vb)} = 0.789$ subst.

$\dfrac{F(VIa)}{-F(VIb)} = 1.653$ subst.

$S_1 = 0.088F$
$S_2 = 0.068F$
$S_3 = 0.065F$
$S_4 = 0.764F$
$S_5 = 0.535F$
$S_6 = 0.751F$
$t_1 = 1.050F$
$t_2 = 0.343F$
$t_3 = 0.248F$
$t_4 = 0.343F$
$t_5 = 0.161F$
$t_6 = 0.489F$
$t_7 = 0.451F$
$t_8 = 0.179F$
$t_9 = 0.281F$
$t_{10} = 0.169F$
$-R_1 = 0.539F$
$-R_2 = 0.744F$
$-R_3 = 16.125F$
$-R_4 = 1.457F$
$R_5 = 6.599F$
$-R_6 = 2.802F$
$R_7 = 6.132F$
$-R_8 = 1.457F$
$R_9 = 1.457F$
$-R_{10} = 2.532F$
$R_{11} = 2.802F$
$-R_{12} = 1.341F$
$R_{13} = 10.752F$
$R_{14} = 4.566F$
$-R_{15} = 2.309F$
$R_{16} = 1.190F$
$n_D(I) = 1.6201$
$n_D(II) = 1.4338$
$n_D(III) = 1.4338$
$n_D(IVa) = 1.4338$
$n_D(IVb) = 1.6130$
$n_D(IVc) = 1.4338$
$n_D(Va) = 1.6203$
$n_D(Vb) = 1.6130$
$n_D(VIa) = 1.7506$
$n_D(VIb) = 1.6130$
$\nu(I) = 63.5$
$\nu(II) = 95.2$
$\nu(III) = 95.2$
$\nu(IVa) = 95.2$
$\nu(IVb) = 44.2$
$\nu(IVc) = 95.2$
$\nu(Va) = 60.3$
$\nu(Vb) = 44.2$
$\nu(VIa) = 27.8$
$\nu(VIb) = 44.2$

Figure 2:
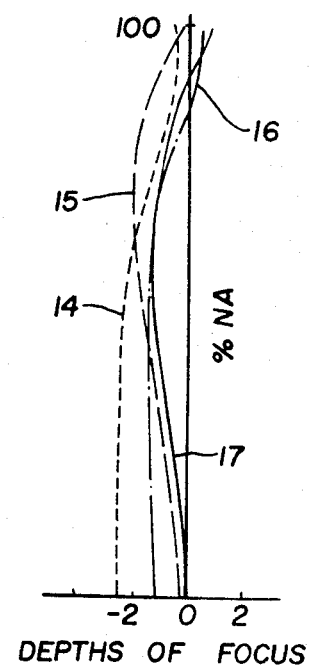
FIG. 2 is a graphical representation of the performance of the complete micro-objective in correcting spherical and chromatic aberrations.

Referring now to FIG. 2, there are shown plots of sphero-chromatism for the entire objective disclosed herein. Sphero-chromatism is the spherical aberration of the lens system using different monochromatic light sources, it is an excellent test for the degree of correction for both the spherical and the chromatic aberrations that is contained in the lens system.

It will be apparent, by reference to the plots, that the change in depth of focus from the center to the edge of the numerical aperture is very good for all of the four colors checked. It should be remembered that this is the criteria necessary for an apochromatic lens system, i.e. that it be corrected for spherical aberration and chromatic aberration for at least four different wavelengths. The greatest change in depth of focus occurs from 0% to approximately 40% of the numerical aperture on curve 14 using light of 4340 angstrom unit wavelength, the Fraunhofer G' line, and it totals only 2.3 depths of focus. The other curves 15, 16, and 17, for 6563 angstrom unit wavelength light, the Fraunhofer C line, 4861 angstrom unit wavelength light, the Fraunhofer F line, and 5896 angstrom unit wavelength light, the Fraunhofer D line, vary even less from the ideal condition.

To achieve the color corrections shown in FIG. 2, it is necessary to incorporate glasses into the design which by the differences in their refractive indices, correct for the chromatic aberrations present in the system. Herein lies the difficulty in designing an apochromatic objective, to achieve the additional color correction for the Fraunhofer G' wavelength radiation without destroying the effect achieved for the other wavelengths. Lens member IV corrects for the spherical aberration in lens members I, II, and III while correcting for much of the chromatic aberration introduced previously. However, it is not possible to correct completely for rays of the blue end of the spectrum in lens member IV without a drastic overcorrection of the spherical aberration. Therefore, lens member V is included to bring the shorter wavelength rays up to the longer wavelength rays. This is accomplished by a very small index break, index differential, between the lens elements $Va$ and $Vb$.

In order to achieve the desired performance from the micro-objective, the following index breaks are necessary for the compound lens members. The index breaks are specified in ranges of dimensionless numerical values, and are the criteria within which the designer must choose the glasses to make up the lens system.

$$0.14 < [n_D(IVb) - n_D(IVa)] < 0.218$$
$$0.14 < [n_D(IVb) - n_D(IVc)] < 0.218$$
$$0.00 < [n_D(Va) - n_D(Vb)] < 0.015$$

While there has been shown and described in detail only one particular form of the present invention, it will be obvious to those skilled in the art that various changes and modifications may be made in the optical details within the ranges of values stated hereinabove without departing from the invention as defined in the appended claims.

I claim:

1. A microscope semi-objective which is used in cooperation with a prescribed negatvie field flattening and aberration correcting lens member (VI) having 5× magnification per se, the negative lens member being used interchangeably with each one of a set of semi-objectives having a range of different low to high powers, the semi-objectives being parfocalized to each other, the field flattening lens member and semi-objective being designed to produce cooperatively a total image magnification of 25× and a numerical aperture of 0.65, the semi-objective producing substantially 5× magnification per se, the equivalent focal length of the field flattening lens member being designated $-F(VI)$, the equivalent focal length of the semi-objective together with the field flattening lens member being designated F, the semi-objective comprising;

a first singlet positive meniscus lens member (I) which is located adjacent to a specimen surface to be examined at an axial distance designated $S_1$ therefrom, a second singlet positive meniscus lens member (II) which is located at an axial distance designated $S_2$ rearwardly of lens member I, a singlet double convex lens member (III) which is located at an axial distance designated $S_3$ rearwardly of lens member II, a positive triplet lens member (IV) which is located at an axial distance designated $S_4$ rearwardly of lens member III, lens member IV including a central double concave lens element (IVb) which lies in surface contact with a front double convex lens member (IVa) and in surface contact with a rear double convex lens member (IVc), a positive doublet lens member (V) which is located at an axial distance designated $S_5$ rearwardly of lens member IV, lens member V including a front double convex lens element (Va) which lies in surface contact with a rear double concave lens element (Vb), lens member V being located at an axial distance designated $S_6$ from the negative field flattening lens member (VI) which includes a front double convex lens element (VIa) which lies in surface contact with a rear double concave lens element (VIb), the ranges of values, in terms of F, for the constructional data by which the lens members and lens elements thereof I to VIb are formed being given in the first table hereinbelow, wherein F(I) to F(V) designate the focal lengths of the successive lens members of the semi-objective and $-F(VI)$ designates the focal length of the negative field flattening lens member, the minus ($-$) sign meaning negative focal length, the designations $F(IVa)$, $-F(IVb)$, $F(IVc)$, $F(Va)$, $-F(Vb)$, $F(VIa)$, and $-F(VIb)$ pertaining to the respective lens elements aforementioned, the designations $t_1$ to $t_{10}$ relating to the axial thicknesses of the successive lens members and elements numbering from the front, and the designations $S_1$ to $S_6$ being the successive interlens airspaces numbering from the specimen surface rearwardly,

TABLE $3.215F < F(I) < 3.347F$
$3.594F < F(II) < 3.740F$
$4.480F < F(III) < 4.662F$
$129.04F < F(IV) < 134.30F$
$5.619F < F(V) < 5.848F$
$3.668F < -F(VI) < 3.818F$ $$\frac{F(IVa)}{-F(IVb)} = 2.364 \text{ subst.}$$

$$\frac{F(IVc)}{-F(IVb)} = 1.902 \text{ subst.}$$

$$\frac{F(Va)}{-F(Vb)} = 0.789 \text{ subst.}$$

$$\frac{F(VIa)}{-F(VIb)} = 1.653 \text{ subst.}$$

$1.029F < t_1 < 1.072F$
$0.336F < t_2 < 0.350F$
$0.243F < t_3 < 0.253F$
$0.336F < t_4 < 0.350F$
$0.157F < t_5 < 0.165F$
$0.478F < t_6 < 0.498F$
$0.441F < t_7 < 0.461F$
$0.169F < t_8 < 0.189F$
$0.271F < t_9 < 0.291F$
$0.159F < t_{10} < 0.179F$
$0.086F < S_1 < 0.090F$
$0.066F < S_2 < 0.070F$
$0.063F < S_3 < 0.067F$
$0.749F < S_4 < 0.779F$
$0.524F < S_5 < 0.546F$
$0.736F < S_6 < 0.766F$ the ranges of dimensionless numerical values for the differences in index of refraction $n_D$ for the glasses from which the compound lens members are formed are given in the second table appearing herebelow,

TABLE $0.140 < [n_D (IVb) - n_D (IV\alpha)] < 0.218$
$0.140 < [n_D (IVb) - n_D (IVc)] < 0.218$
$0.000 < [n_D (Va) - n_D (Vb)] < 0.015$ 2. A microscope semi-objective as claimed in claim 1 wherein the ranges of dimensionless numerical values for the refractive index $n_D$ relating to the glasses from which the successive lens members and elements I to VIb are made are given in the third table appearing herebelow,

TABLE $1.6186 < n_D(I) < 1.6216$
$1.4328 < n_D(II) < 1.4348$
$1.4328 < n_D(III) < 1.4348$
$1.4328 < n_D(IVa) < 1.4348$
$1.6115 < n_D(IVb) < 1.6145$
$1.4328 < n_D(IVc) < 1.4348$
$1.6188 < n_D(Va) < 1.6218$
$1.6115 < n_D(Vb) < 1.6145$
$1.7486 < n_D(VIa) < 1.7526$
$1.6115 < n_D(VIb) < 1.6145$

3. A microscope semi-objective as claimed in claim 2 wherein said glasses from which said successive lens elements I to IVb are made are further characterized by the ranges of dimensionless numerical values for the Abbe number $\nu$ as given in the fourth table appearing herebelow,

TABLE $63.0 < \nu(I) < 64.0$
$94.5 < \nu(II) < 95.9$
$94.5 < \nu(III) < 95.9$
$94.5 < \nu(IVa) < 95.9$
$43.9 < \nu(IVb) < 44.5$
$94.5 < \nu(IVc) < 95.9$
$59.8 < \nu(Va) < 60.8$
$43.9 < \nu(Vb) < 44.5$
$27.6 < \nu(VIa) < 28.0$
$43.9 < \nu(VIb) < 44.5$

4. A microscope semi-objective as claimed in claim 3 wherein the specific values, in terms of F, for the constructional data by which said lens members and lens elements thereof are formed being given substantially in the fifth table hereinbelow, wherein F(I) to F(V) designate the focal lengths of the successive lens members of the semi-objective and —F(VI) designates the focal length of the negative field flattening lens members, the minus (—) sign meaning negative focal length, the designations F(IVa), —F(IVb), F(IVc), F(Va), —F(Vb), F(VIa), and —F(VIb) pertaining to the respective lens elements aforementioned, the designations $t_1$ to $t_{10}$ relating to the axial thicknesses of the successive lens members and lens elements numbering from the front, and the designations $S_1$ to $S_6$ being the successive interlens airspaces numbering from the specimen surface rearwardly,

TABLE $F(I) = 3.281F$
$F(II) = 3.667F$
$F(III) = 4.571F$
$F(IV) = 131.67F$
$F(V) = 5.734F$
$-F(VI) = 3.743F$ $\dfrac{F(IVa)}{-F(IVb)} = 2.364$ subst.

$\dfrac{F(IVc)}{-F(IVb)} = 1.902$ subst.

$\dfrac{F(Va)}{-F(Vb)} = 0.789$ subst.

$\dfrac{F(VIa)}{-F(VIb)} = 1.653$ subst.

$t_1 = 1.050F$
$t_2 = 0.343F$
$t_3 = 0.248F$
$t_4 = 0.343F$
$t_5 = 0.161F$
$t_6 = 0.489F$
$t_7 = 0.451F$
$t_8 = 0.179F$
$t_9 = 0.281F$
$t_{10} = 0.169F$
$S_1 = 0.088F$
$S_2 = 0.068F$
$S_3 = 0.065F$
$S_4 = 0.764F$
$S_5 = 0.535F$
$S_6 = 0.751F$ wherein the specific values for the refractive index $n_D$ and the Abbe number $\nu$ relating to the glasses from which the successive lens elements I to IVb are made being given substantially in the sixth table appearing herebelow,

TABLE $n_D(I) = 1.6201$
$n_D(II) = 1.4338$
$n_D(III) = 1.4338$
$n_D(IVa) = 1.4338$
$n_D(IVb) = 1.6130$
$n_D(IVc) = 1.4338$
$n_D(Va) = 1.6203$
$n_D(Vb) = 1.6130$
$n_D(VIa) = 1.7506$
$n_D(VIb) = 1.6130$
$\nu(I) = 63.5$
$\nu(II) = 95.2$
$\nu(III) = 95.2$
$\nu(IVa) = 95.2$
$\nu(IVb) = 44.2$
$\nu(IVc) = 95.2$
$\nu(Va) = 60.3$
$\nu(Vb) = 44.2$
$\nu(VIa) = 27.8$
$\nu(VIb) = 44.2$

5. A microscope semi-objective which is used in cooperation with a prescribed negative field flattening and aberration correcting lens member (VI) having 5× magnification per se, the negative lens member being used interchangeably with each one of a set of semi-objectives having a range of different low to high powers, the semi-objectives being parfocalized to each other, the field flattening lens member and semi-objective being designed to produce cooperatively a total image magnification of 25× and a numerical aperture of 0.65, the semi-objective producing substantially 5× magnification per se, the equivalent focal length of the field flattening lens member being designated —F(VI), the equivalent focal length of the semi-objective together with the field flattening lens member being designated F, the semi-objective comprising;
  a first singlet positive meniscus lens member (I) which is located adjacent to a specimen surface to be examined at an axial distance designated $S_1$ therefrom,
  a second singlet positive meniscus lens member (II) which is located at an axial distance designated $S_2$ rearwardly of lens member I,
  a singlet double convex lens member (III) which is located at an axial distance designated $S_3$ rearwardly of lens member II,
  a positive triplet lens member (IV) which is located at an axial distance designated $S_4$ rearwardly of lens member III, lens member IV including a central double concave lens element (IVb) which lies in surface contact with a front double convex lens member (IVa) and in surface contact with a rear double convex lens member (IVc),
  a positive doublet lens member (V) which is located at an axial distance designated $S_5$ rearwardly of lens member IV, lens member V including a front double convex lens element (Va) which lies in surface contact with a rear double concave lens element (Vb),
  lens member V being located at an axial distance designated $S_6$ from the negative field flattening lens member (VI) which includes a front double convex lens element (VIa) which lies in surface contact with a rear double concave lens element (VIb), the ranges of values, in terms of F, for the constructional data by which the lens members and lens elements thereof I to VIb are formed being given in the first table hereinbelow, wherein $-R_1$ to $R_{16}$ represent the successive radii of the lens surfaces formed on the lens members and lens elements thereof I to VIb numbering from the front, the minus (−) sign meaning that the lens surface so identified has its center of curvature located on the front side of the lens surface, the designations $t_1$ to $t_{10}$ relating to the axial thicknesses of the successive lens elements numbering from the front, and the designations $S_1$ to $S_6$ being the successive interlens airspaces numbering from the specimen surface rearwardly,

TABLE $0.534F < -R_1 < 0.544F$
$0.736F < -R_2 < 0.751F$
$15.951F < -R_3 < 16.299F$
$1.442F < -R_4 < 1.472F$
$6.533F < R_5 < 6.665F$
$2.774F < -R_6 < 2.830F$
$6.070F < R_7 < 6.193F$
$1.442F < -R_8 < 1.472F$
$1.442F < R_9 < 1.472F$
$2.506F < -R_{10} < 2.558F$
$2.774F < R_{11} < 2.830F$
$1.328F - R_{12} < 1.355F$
$10.645F < R_{13} < 10.860F$
$4.520F < R_{14} < 4.611F$
$2.286F < -R_{15} < 2.333F$
$1.178F < R_{16} < 1.202F$
$1.029F < t_1 < 1.072F$
$0.336F < t_2 < 0.350F$
$0.243F < t_3 < 0.253F$
$0.336F < t_4 < 0.350F$
$0.157F < t_5 < 0.165F$
$0.478F < t_6 < 0.498F$
$0.441F < t_7 < 0.461F$
$0.169F < t_8 < 0.189F$
$0.271F < t_9 < 0.291F$
$0.159F < t_{10} < 0.179F$
$0.086F < S_1 < 0.090F$
$0.066F < S_2 < 0.070F$
$0.063F < S_3 < 0.067F$
$0.749F < S_4 < 0.779F$
$0.524F < S_5 < 0.546F$
$0.736F < S_6 < 0.766F$ the ranges of dimensionless numerical values for the differences in index of refraction $n_D$ for the glasses from which the compound lens members are formed are given in the second table appearing herebelow,

TABLE $0.140 < [n_D(IVb) - n_D(IVa)] < 0.218$
$0.140 < [n_D(IVb) - n_D(IVc)] < 0.218$
$0.000 < [n_D(Va) - n_D(IVb)] < 0.015$

6. A microscope semi-objective as claimed in claim 5 wherein the ranges of dimensionless numerical values for the refractive index $n_D$ and the Abbe number $\nu$ relating to glasses from which the successive lens elements I to VIb are made being given in the third table appearing herebelow,

TABLE $1.6186 < n_D(I) < 1.6216$
$1.4328 < n_D(II) < 1.4348$
$1.4328 < n_D(III) < 1.4348$
$1.4328 < n_D(IVa) < 1.4348$
$1.6115 < n_D(IVb) < 1.6145$
$1.4328 < n_D(IVc) < 1.4348$
$1.6188 < n_D(Va) < 1.6218$
$1.6115 < n_D(Vb) < 1.6145$
$1.7486 < n_D(VIa) < 1.7526$
$1.6115 < n_D(VIb) < 1.6145$
$63.0 < \nu(I) < 64.0$
$94.5 < \nu(II) < 95.9$
$94.5 < \nu(III) < 95.9$
$94.5 < \nu(IVa) < 95.9$
$43.9 < \nu(IVb) < 44.5$
$94.5 < \nu(IVc) < 95.9$
$59.8 < \nu(Va) < 60.8$
$43.9 < \nu(Vb) < 44.5$
$27.6 < \nu(VIa) < 28.0$
$43.9 < \nu(VIb) < 44.5$

7. A microscope semi-objective as claimed in claim 6 wherein the specific values, in terms of F, for the constructional data by which said lens members and lens elements thereof I to VIb are formed being given substantially in the fourth table hereinbelow, wherein $-R_1$ to $R_{16}$ represent said successive radii of said lens surfaces formed on said lens elements I to VIb numbering from the front, the minus (−) sign meaning that the lens surface so identified has its center of curvature located on the front side of the surface, the designations $t_1$ to $t_{10}$ represent the axial thicknesses of said successive lens elements numbering from the front, and $S_1$ to $S_6$ represent said successive interlens airspaces numbered from said specimen surface rearwardly,

TABLE $-R_1 = 0.539F$
$-R_2 = 0.744F$
$-R_3 = 16.125F$
$-R_4 = 1.457F$
$R_5 = 6.599F$
$-R_6 = 2.802F$
$R_7 = 6.132F$
$-R_8 = 1.457F$
$R_9 = 1.457F$
$-R_{10} = 2.532F$
$R_{11} = 2.802F$
$-R_{12} = 1.341F$
$R_{13} = 10.752F$
$R_{14} = 4.566F$
$-R_{15} = 2.309F$
$R_{16} = 1.190F$
$t_1 = 1.050F$
$t_2 = 0.343F$
$t_3 = 0.248F$
$t_4 = 0.343F$
$t_5 = 0.161F$
$t_6 = 0.489F$
$t_7 = 0.451F$
$t_8 = 0.179F$
$t_9 = 0.281F$
$t_{10} = 0.169F$
$S_1 = 0.088F$
$S_2 = 0.068F$
$S_3 = 0.065F$
$S_4 = 0.764F$
$S_5 = 0.535F$
$S_6 = 0.751F$ wherein the specific dimensionless numerical values for the refractive index $n_D$ and the Abbe number $\nu$ relating to the glasses from which said successive lens elements I to VIb are made being given substantially in the fifth table herebelow,

TABLE $n_D(I) = 1.6201$
$n_D(II) = 1.4338$
$n_D(III) = 1.4338$
$n_D(IVa) = 1.4338$

TABLE—Continued $n_D(IVb) = 1.6130$
$n_D(IVc) = 1.4338$
$n_D(Va) = 1.6203$
$n_D(Vb) = 1.6130$
$n_D(VIa) = 1.7506$
$n_D(VIb) = 1.6130$
$\nu(I) = 63.5$
$\nu(II) = 95.2$
$\nu(III) = 95.2$
$\nu(IVa) = 95.2$
$\nu(IVb) = 44.2$
$\nu(IVc) = 95.2$
$\nu(Va) = 60.3$
$\nu(Vb) = 44.2$
$\nu(VIa) = 27.8$
$\nu(VIb) = 44.2$

References Cited

UNITED STATES PATENTS 3,174,396　3/1965　Ruben _____ 350—176

JOHN K. CORBIN, Primary Examiner

U.S. Cl. X.R.

350—177

PO-1050
(5/69)

UNITED STATES PATENT OFFICE
CERTIFICATE OF CORRECTION

Patent No. 3,514,189    Dated    May 26, 1970

Inventor(s)    George H. Aklin

It is certified that error appears in the above-identified patent and that said Letters Patent are hereby corrected as shown below:

Col. 4, line 70 (Table I) change "$C_5$" to -- $S_5$ --;

Col. 5, line 37, (Table II) change (VIb) to -- (Vb) --

SIGNED AND
SEALED
NOV 24 1970

(SEAL)
Attest:

Edward M. Fletcher, Jr.
Attesting Officer

WILLIAM E. SCHUYLER, JR.
Commissioner of Patents